(12) United States Patent
Philyaw et al.

(10) Patent No.: US 6,629,133 B1
(45) Date of Patent: Sep. 30, 2003

(54) INTERACTIVE DOLL

(75) Inventors: Jeffry Jovan Philyaw, Dallas, TX (US); David Kent Mathews, Carrollton, TX (US)

(73) Assignee: LV Partners, L.P., Dallas, TX (US)

( * ) Notice: Subject to any disclaimer, the term of this patent is extended or adjusted under 35 U.S.C. 154(b) by 0 days.

(21) Appl. No.: 09/378,219

(22) Filed: Aug. 19, 1999

Related U.S. Application Data

(63) Continuation-in-part of application No. 09/151,530, filed on Sep. 11, 1998, now Pat. No. 6,098,106.

(51) Int. Cl.[7] ............................ G06F 15/16; A63H 13/00

(52) U.S. Cl. ........................ 709/217; 709/201; 709/203; 709/206; 709/219; 446/142; 446/175; 446/199; 446/268

(58) Field of Search .............................. 709/201, 219, 709/206, 203; 250/205; 725/153; 446/404, 142, 175, 199, 268

(56) References Cited

U.S. PATENT DOCUMENTS

| | | | |
|---|---|---|---|
| 3,668,312 A | 6/1972 | Yamamoto et al. ........... | 348/17 |
| 4,002,886 A | 1/1977 | Sundelin ................ | 235/61.7 R |
| 4,042,792 A | 8/1977 | Pakenham et al. ............ | 179/90 |
| 4,365,148 A | 12/1982 | Whitney ..................... | 235/383 |

(List continued on next page.)

FOREIGN PATENT DOCUMENTS

| | | | | |
|---|---|---|---|---|
| EP | 0 961 250 A2 | 12/1999 | ........... | G07F/19/00 |
| JP | 10188140 A | 12/1996 | ............ | G07G/1/12 |
| WO | WO 95/10813 | 10/1994 | ........ | G06F/15/403 |
| WO | WO 96/07146 | 9/1995 | ............ | G06F/17/00 |
| WO | WO 97/37319 | 2/1997 | ............ | G06K/7/10 |
| WO | WO 98/09243 | 8/1997 | ............ | G06F/19/00 |
| WO | WO 98/03923 | 1/1998 | ......... | G06F/15/163 |
| WO | WO 98/06055 | 2/1998 | ......... | G06F/163/00 |
| WO | WO 98/19259 | 5/1998 | ......... | G06F/17/60 |
| WO | WO 98/40823 | 9/1998 | ........... | G06F/13/00 |
| WO | WO 99/00979 | 1/1999 | .......... | H04N/7/085 |
| WO | WO 99/63457 | 6/1999 | .......... | G06F/17/30 |
| WO | WO 00/09229 | 2/2000 | ............ | A63H/3/28 |

OTHER PUBLICATIONS

"Group Decision Support System: Development and Application", Energy Systems, Westinghouse, Pittsburgh, PA.

"New Technologies in Credit Card Authentication", Pieter de Bryne, Institute for Communications Technology, Zurich, Switzerland.

"A VITAL, a Private Teaching System by Fax Communication", Atsusji Iizawa, Noriro Sugiki, Yukari Shitora and Hideko Kunii, Software Research Center, Tokyo, Japan.

"Document on Computer" USPS Technical Support Center, Norman, OK.

"Development of a Commercially Successful Wearable Data Collection System", Symbol Technologies, Inc.

(List continued on next page.)

*Primary Examiner*—Mark R. Powell
*Assistant Examiner*—Paul Kang
(74) *Attorney, Agent, or Firm*—Gregory M. Howison; Howison & Arnott, LLP

(57) ABSTRACT

An interactive doll is disclosed having one or more sensors contained therein. The one or more sensors are operable to trigger output of a signal from the doll in response to the one or more sensors being activated by physical stimuli of a user. A processor located with the user and the doll at a first node of a global communication network processes the signal. The processor is operable to link the signal with one or more remote nodes also located on the global communication network. The one or more remote nodes return information to the processor for presentation to the user via the user's computer, in response to the one or more sensors being activated.

14 Claims, 9 Drawing Sheets

U.S. PATENT DOCUMENTS

| | | | |
|---|---|---|---|
| 4,621,259 A | 11/1986 | Schepers et al. | 345/180 |
| 4,654,482 A | 3/1987 | DeAngelis | 379/95 |
| 4,780,599 A | 10/1988 | Baus | 235/383 |
| 4,785,296 A | 11/1988 | Tabata et al. | 340/731 |
| 4,816,904 A | 3/1989 | McKenna et al. | 348/13 |
| 4,817,136 A | 3/1989 | Rhoads | 379/375 |
| 4,833,308 A | 5/1989 | Humble | 235/383 |
| 4,841,132 A | 6/1989 | Kajitani et al. | 235/472 |
| 4,845,634 A | 7/1989 | Vitek et al. | 364/468 |
| 4,894,789 A | 1/1990 | Yee | 348/552 |
| 4,899,370 A | 2/1990 | Kameo et al. | 379/104 |
| 4,901,073 A | 2/1990 | Kibrick | 341/13 |
| 4,905,094 A | 2/1990 | Pocock et al. | 386/106 |
| 4,907,264 A | 3/1990 | Seiler et al. | 379/216 |
| 4,916,293 A | 4/1990 | Cartlidge et al. | 235/375 |
| 4,937,853 A | 6/1990 | Brule et al. | 379/96 |
| 4,947,028 A | 8/1990 | Gorog | 235/380 |
| 4,959,530 A | 9/1990 | O'Connor | 235/383 |
| 4,975,948 A | 12/1990 | Andresen et al. | 379/355 |
| 4,984,155 A | 1/1991 | Geier et al. | 364/401 |
| 5,038,023 A | 8/1991 | Saliga | 235/385 |
| 5,054,096 A | 10/1991 | Beizer | 382/41 |
| 5,088,045 A | 2/1992 | Shimanaka et al. | 364/468 |
| 5,111,391 A | 5/1992 | Fields et al. | 364/401 |
| 5,115,326 A | 5/1992 | Burgess et al. | 358/440 |
| 5,128,752 A | 7/1992 | Von Kohorn | 358/84 |
| 5,144,654 A | 9/1992 | Kelley et al. | 379/356 |
| 5,161,037 A | 11/1992 | Saito | 358/468 |
| 5,161,214 A | 11/1992 | Addink et al. | 395/145 |
| 5,182,705 A | 1/1993 | Barr et al. | 364/401 |
| 5,189,630 A | 2/1993 | Barstow et al. | 364/514 |
| 5,191,525 A | 3/1993 | LeBrun et al. | 364/419 |
| 5,198,644 A | 3/1993 | Pfeiffer et al. | 235/383 |
| 5,235,654 A | 8/1993 | Anderson et al. | 382/61 |
| 5,241,402 A | 8/1993 | Aboujaoude et al. | 358/406 |
| 5,243,531 A | 9/1993 | DiPippo et al. | 364/468 |
| 5,247,347 A | 9/1993 | Litteral et al. | 348/7 |
| 5,262,860 A | 11/1993 | Fitzpatrick et al. | 348/461 |
| 5,285,278 A | 2/1994 | Holman | 348/10 |
| 5,287,181 A | 2/1994 | Holman | 348/473 |
| 5,288,976 A | 2/1994 | Citron et al. | 235/375 |
| 5,296,688 A | 3/1994 | Hamilton et al. | 235/375 |
| 5,304,786 A | 4/1994 | Pavlidis et al. | 235/462 |
| 5,305,195 A | 4/1994 | Murphy | 705/1 |
| 5,319,454 A | 6/1994 | Schutte | 348/5.5 |
| 5,324,922 A | 6/1994 | Roberts | 235/375 |
| 5,331,547 A | 7/1994 | Laszlo | 364/413.01 |
| 5,340,966 A | 8/1994 | Morimoto | 235/376 |
| 5,357,276 A | 10/1994 | Banker et al. | 348/7 |
| 5,362,948 A | 11/1994 | Morimoto | 235/376 |
| 5,382,779 A | 1/1995 | Gupta | 235/383 |
| 5,386,298 A | 1/1995 | Bronnenberg et al. | 358/403 |
| 5,398,336 A | 3/1995 | Tantry et al. | 395/600 |
| 5,405,232 A | 4/1995 | Lloyd et al. | 414/280 |
| 5,418,713 A | 5/1995 | Allen | 364/403 |
| 5,420,403 A | 5/1995 | Allum et al. | 235/375 |
| 5,420,943 A | 5/1995 | Mak | 382/313 |
| 5,424,524 A | 6/1995 | Ruppert et al. | 235/462 |
| 5,438,355 A | 8/1995 | Palmer | 348/1 |
| 5,446,490 A | 8/1995 | Blahut et al. | 348/7 |
| 5,446,919 A | 8/1995 | Wilkins | 455/6.2 |
| 5,491,508 A | 2/1996 | Friedell et al. | 348/16 |
| 5,493,107 A | 2/1996 | Gupta et al. | 235/383 |
| 5,519,878 A | 5/1996 | Dolin, Jr. | 395/800 |
| 5,530,852 A | 6/1996 | Meske, Jr. et al. | 396/600 |
| 5,570,295 A | 10/1996 | Isenberg et al. | 379/90.01 |
| 5,572,643 A | 11/1996 | Judson | 395/793 |
| 5,592,551 A | 1/1997 | Lett et al. | 380/20 |
| 5,594,226 A | 1/1997 | Steger | 235/379 |
| 5,602,377 A | 2/1997 | Beller et al. | 235/462 |
| 5,604,542 A | 2/1997 | Dedrick | 348/552 |
| 5,640,193 A | 6/1997 | Wellner | 348/7 |
| 5,649,186 A | 7/1997 | Ferguson | 395/610 |
| 5,664,110 A | 9/1997 | Green et al. | 705/26 |
| 5,671,282 A | 9/1997 | Wolff et al. | 380/25 |
| 5,675,721 A | 10/1997 | Freedman et al. | 395/129 |
| 5,682,540 A | 10/1997 | Klotz, Jr. et al. | 395/766 |
| 5,694,163 A | 12/1997 | Harrison | 348/13 |
| 5,708,780 A | 1/1998 | Levergood et al. | 709/229 |
| 5,710,887 A | 1/1998 | Chelliah et al. | 395/226 |
| 5,715,314 A | 2/1998 | Payne et al. | 705/78 |
| 5,724,424 A | 3/1998 | Gifford | 705/79 |
| 5,745,681 A | 4/1998 | Levine et al. | 395/200.3 |
| 5,746,602 A | 5/1998 | Kikinis | 434/169 |
| 5,754,906 A | 5/1998 | Yoshida | 396/448 |
| 5,757,917 A | 5/1998 | Rose et al. | 380/25 |
| 5,761,606 A | 6/1998 | Wolzien | 455/6.2 |
| 5,764,906 A | 6/1998 | Edelstein et al. | 395/200.49 |
| 5,765,176 A | 6/1998 | Bloomberg | 707/514 |
| 5,768,528 A | 6/1998 | Stumm | 709/231 |
| 5,774,664 A | 6/1998 | Hidary et al. | 395/200 |
| 5,774,870 A | 6/1998 | Storey | 705/14 |
| 5,778,367 A | 7/1998 | Wesinger, Jr. et al. | 707/10 |
| 5,790,793 A | 8/1998 | Higley | 709/218 |
| 5,791,991 A | 8/1998 | Small | 463/41 |
| 5,794,210 A | 8/1998 | Goldhaber et al. | 705/14 |
| 5,796,952 A | 8/1998 | Davis et al. | 305/200.54 |
| 5,804,803 A | 9/1998 | Cragun et al. | 235/375 |
| 5,815,776 A | 9/1998 | Nukada | 399/174 |
| 5,832,223 A | 11/1998 | Hara et al. | 395/200.47 |
| 5,833,468 A | 11/1998 | Guy et al. | 434/350 |
| 5,848,202 A | 12/1998 | D'Eri et al. | 382/306 |
| 5,848,413 A | 12/1998 | Wolff | 707/10 |
| 5,854,897 A | 12/1998 | Radziewicz et al. | 709/224 |
| 5,864,823 A | 1/1999 | Levitan | 105/14 |
| 5,869,819 A | 2/1999 | Knowles et al. | 235/375 |
| 5,905,248 A | 5/1999 | Russell et al. | 235/462 |
| 5,905,251 A | 5/1999 | Knowles | 235/472.01 |
| 5,905,665 A | 5/1999 | Rim | 364/746 |
| 5,905,865 A | 5/1999 | Palmer et al. | 395/200.47 |
| 5,907,793 A | 5/1999 | Reams | 455/3.1 |
| 5,912,454 A * | 6/1999 | Castillo et al. | 250/205 |
| 5,913,210 A | 6/1999 | Call | 707/4 |
| 5,915,090 A | 6/1999 | Joseph et al. | 709/202 |
| 5,918,214 A | 6/1999 | Perkowski | 705/27 |
| 5,925,865 A | 7/1999 | Steger | 235/379 |
| 5,929,850 A | 7/1999 | Broadwin et al. | 345/327 |
| 5,932,863 A | 8/1999 | Rathus et al. | 235/462.15 |
| 5,933,829 A | 8/1999 | Durst et al. | 707/10 |
| 5,948,061 A | 9/1999 | Merriman et al. | 709/219 |
| 5,957,695 A | 9/1999 | Redford et al. | 434/307 R |
| 5,960,411 A | 9/1999 | Hartman et al. | 705/26 |
| 5,961,603 A | 10/1999 | Kunkel et al. | 709/229 |
| 5,970,471 A | 10/1999 | Hill | 705/26 |
| 5,970,472 A | 10/1999 | Allsop et al. | 705/26 |
| 5,971,277 A | 10/1999 | Cragun et al. | 235/462.01 |
| 5,974,443 A | 10/1999 | Jeske | 709/202 |
| 5,974,451 A | 10/1999 | Simmons | 709/218 |
| 5,976,833 A | 11/1999 | Furukawa et al. | 435/69.1 |
| 5,978,773 A | 11/1999 | Hudetz et al. | 709/219 |
| 5,991,739 A | 11/1999 | Cupps et al. | 705/26 |
| 5,992,752 A | 11/1999 | Wilz, Sr. et al. | 235/472.01 |
| 5,995,105 A | 11/1999 | Reber et al. | 345/356 |
| 6,002,394 A | 12/1999 | Schein et al. | 345/327 |
| 6,003,073 A | 12/1999 | Solvason | 709/219 |
| 6,006,257 A | 12/1999 | Slezak | 709/219 |
| 6,009,410 A | 12/1999 | LeMole et al. | 709/219 |
| 6,009,465 A | 12/1999 | Decker et al. | 709/219 |
| 6,012,102 A | 1/2000 | Shachar | 710/5 |
| 6,018,764 A | 1/2000 | Field et al. | 709/217 |
| 6,049,539 A | 4/2000 | Lee et al. | 370/355 |

| | | |
|---|---|---|
| 6,064,979 A | 5/2000 | Perkowski .................... 705/26 |
| 6,108,656 A | 8/2000 | Durst et al. ................... 707/10 |
| 6,368,177 B1 * | 4/2002 | Gabai et al. ................ 446/404 |
| 6,415,439 B1 * | 7/2002 | Randell et al. ............. 725/153 |

OTHER PUBLICATIONS

What do forward looking companies consider in their plans and developments?, A.G. Johnston, Nestle.

"The Automation Synergy", Neves and Noivo, Portugal.

"Integration of Hand–Written Address Interpretation Technology into the United States Postal Service Remote Computer Reader System", Shihari (CEDAR, SUNY at Buffalo) and Kueberg (U.S. Postal Service, VA).

"Paper Based Document Security—A Review", van Renesse, TNO Institute of Applied Physics, The Netherlands.

"IEEE Standard for Bar Coding for Distribution Transformers" Transformers Committee of the IEEE Power Engineering Society, The Institute of Electrical and Electronics Engineers, Inc. NY.

"The Stylus™–Shopping from Home", STYLUS Innovation, MA.

"Distributing Uniform Resource Locators as Bar Code Images", IBM Technical Disclosure Bulleting, Jan. 1996.

"Bar Code Method for Automating Catalog Orders", IBM Technical Disclosure Bulletin, Sep. 1998.

"Bar–Code Recognition System Using Image Processing", Kuroki, Yoneoka et al., Hitachi Research Laborator.

* cited by examiner

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

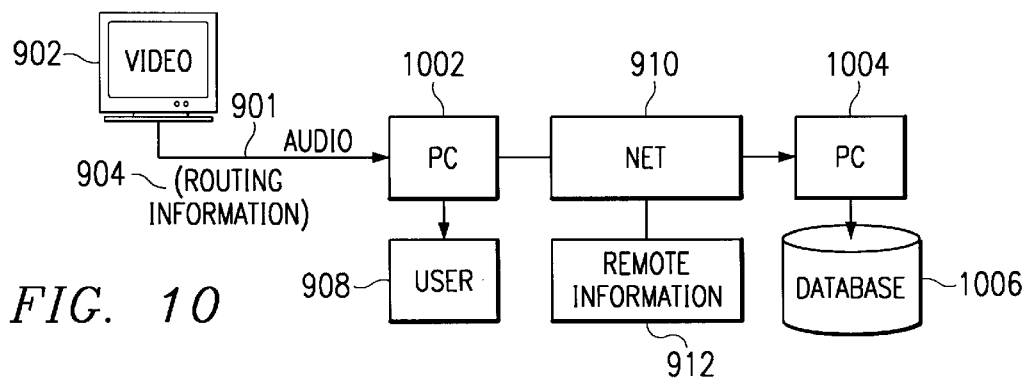
FIG. 10
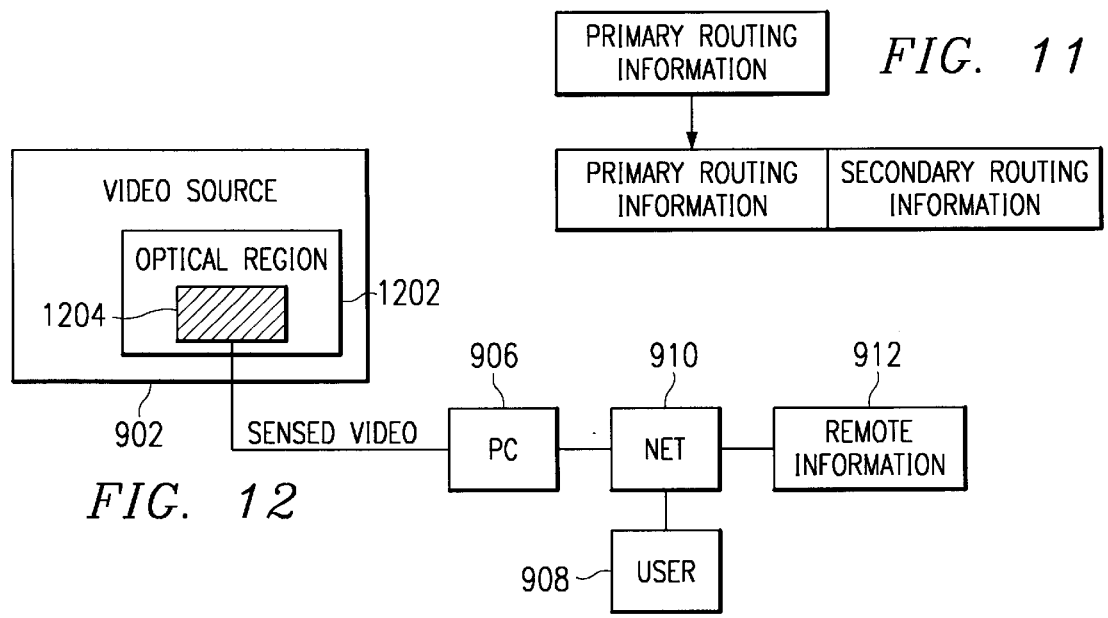
FIG. 11
FIG. 12
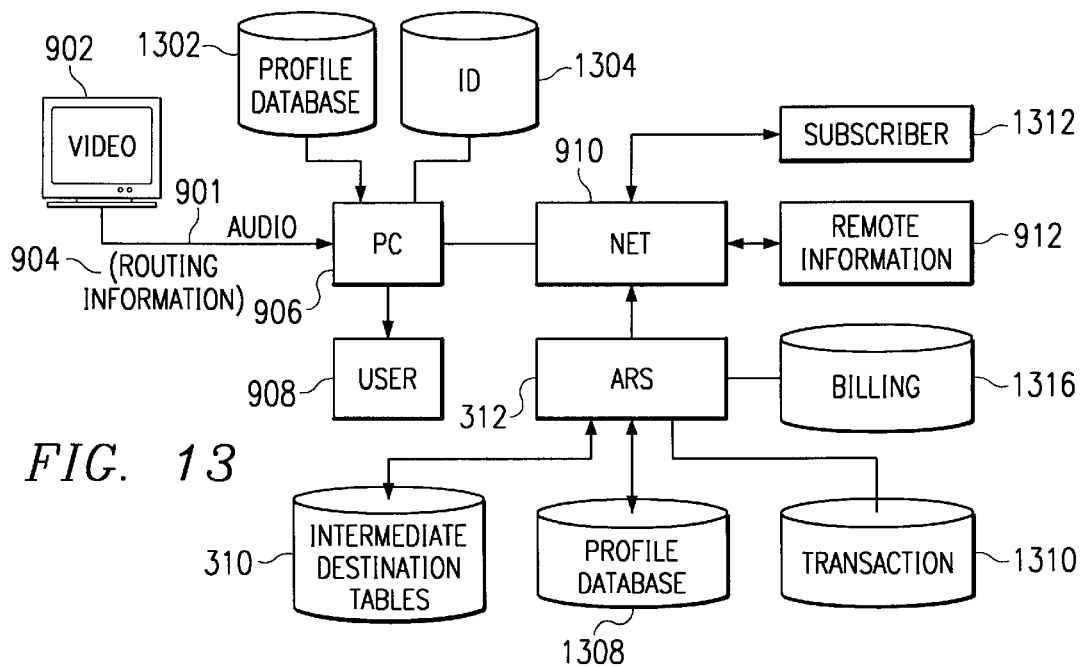
FIG. 13

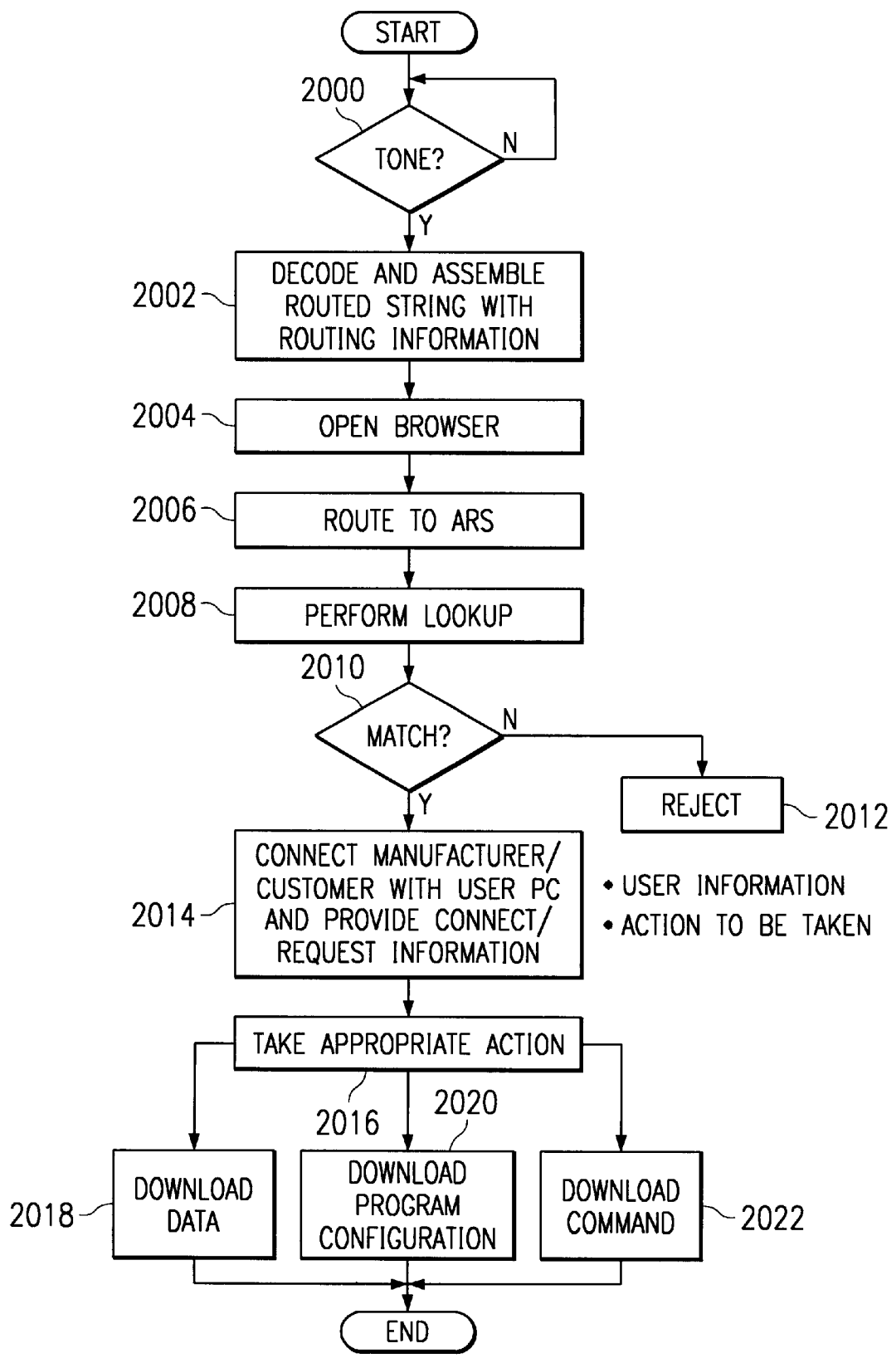

INTERACTIVE DOLL

CROSS REFERENCE TO RELATED APPLICATION

This application is a Continuation-In-Part of U.S. patent application Ser. No. 09/151,530 entitled "METHOD FOR CONTROLLING A COMPUTER WITH AN AUDIO SIGNAL" filed on Sep. 11, 1998, and issued on Aug. 1, 2000 as U.S. Pat. No. 6,098,106.

TECHNICAL FIELD OF THE INVENTION

This invention is related to a method of controlling a computer and, more particularly, to a method for automatically eliciting a response from a remote site disposed on a network from the activation of a sensor at a first site.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line commerce necessitates a large database.

SUMMARY OF THE INVENTION

The present invention disclosed and claimed herein is a method for controlling a computer via an interactive doll having one or more sensors contained therein. The one or more sensors are operable to trigger output of a signal from the doll in response to the one or more sensors being activated by physical stimuli of a user. A processor located with the user and the doll at a first node of a global communication network processes the signal. The processor is operable to link the signal with one or more remote nodes also located on the global communication network. The one or more remote nodes return information to the processor for presentation to the user, in response to the one or more sensors being activated. dr

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIGS. 16 and 16a illustrates a block diagram of an interactive doll according to a disclosed embodiment;

FIG. 20 illustrates a flowchart of an alternative embodiment where a remote site takes additional action in response to receiving a message from the interactive doll.

DETAILED DESCRIPTION OF THE INVENTION

Figure 1:
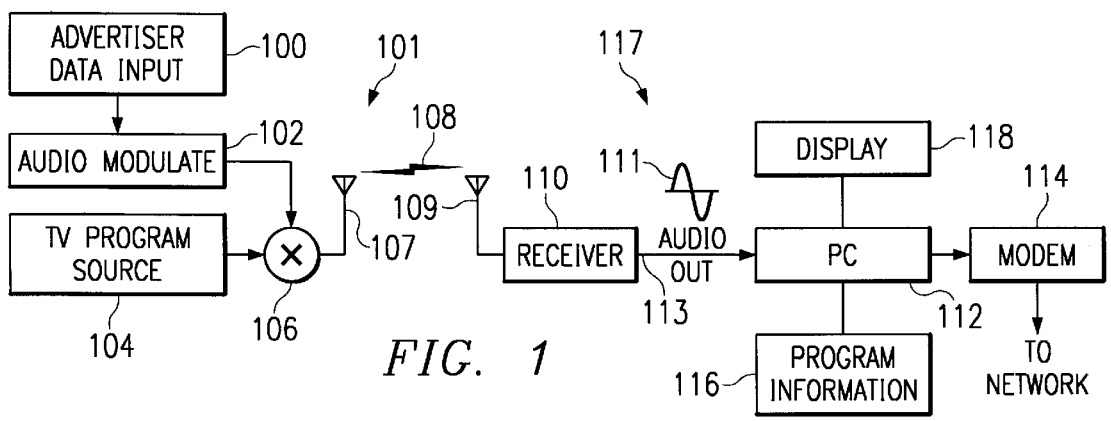
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment a the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
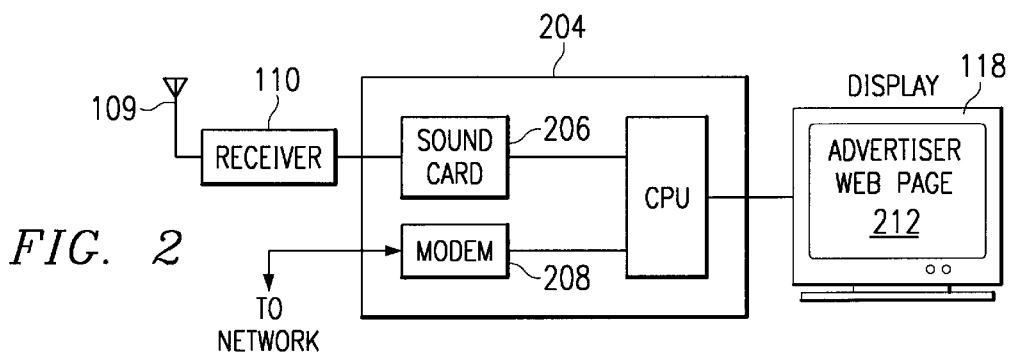
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL. This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
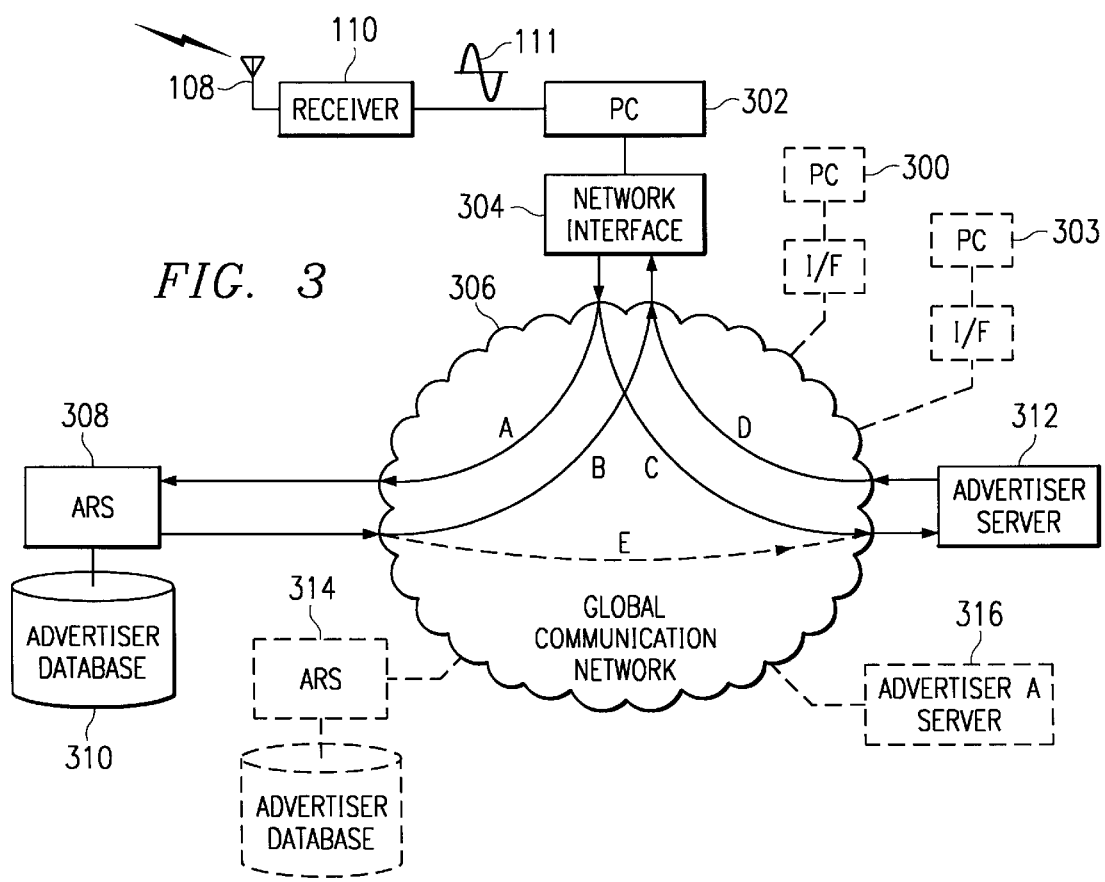
FIG. 3 illustrates system interactions over a global network.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.el., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. It should be noted that although the disclosed invention discusses a global communication network, the system is also applicable to LANs, WANs, and peer-to-peer network configurations. Additionally the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4a–4e illustrate the various message packets transmitted between the source PC and network servers used in the preferred embodiment.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. However, it should be understood that any protocol can be used, with the primary requirement that a browser can forward the product information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorers® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Figure 4C:
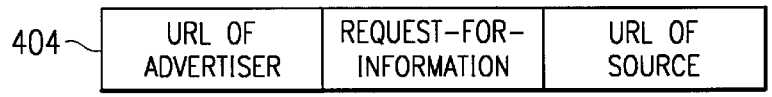

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Figure 4D:
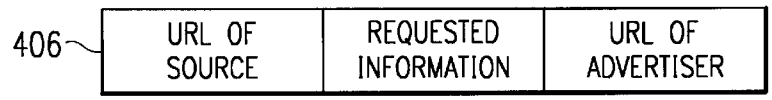

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Figure 4E:
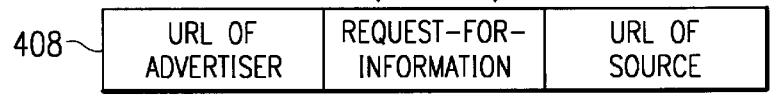

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figure 5:
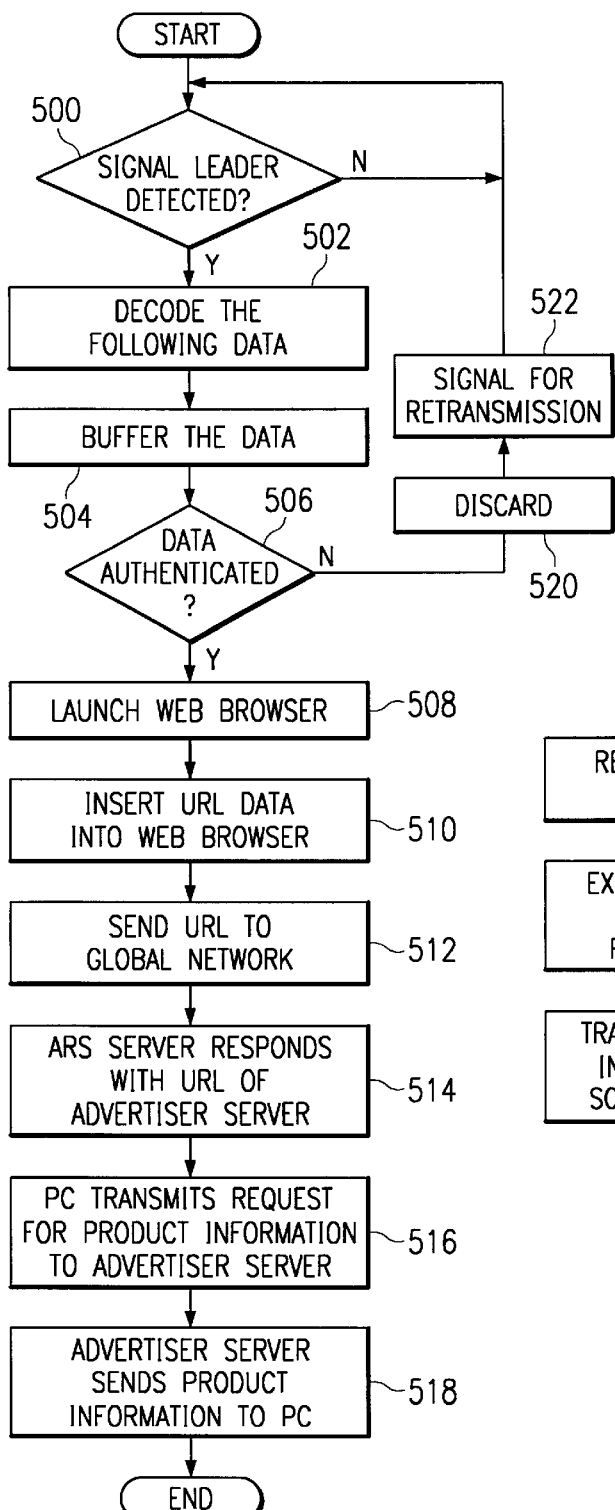
FIG. 5 is a flowchart depicting operation of the system according to the preferred embodiment.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In finction block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Figure 6:
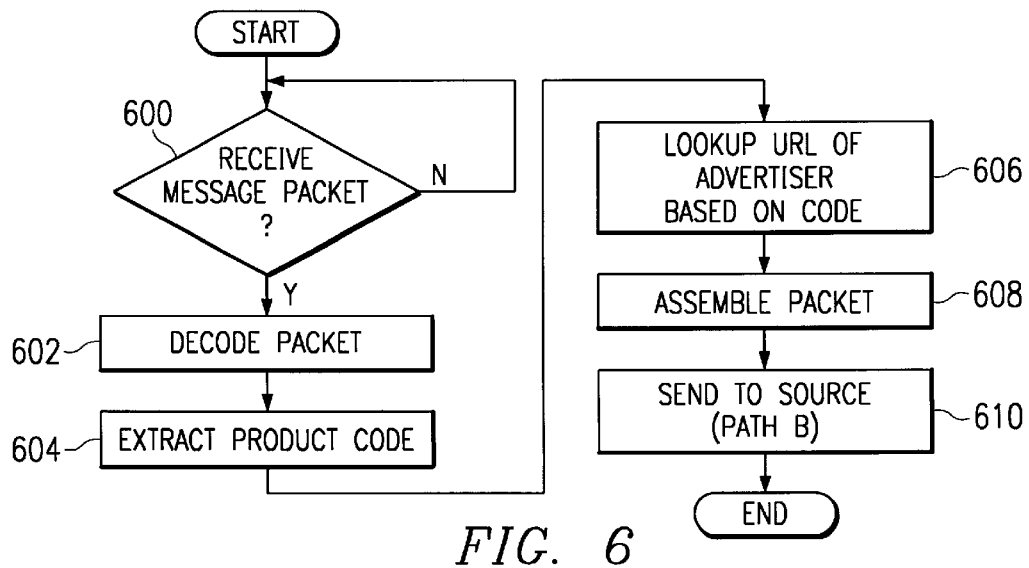
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Figure 7:
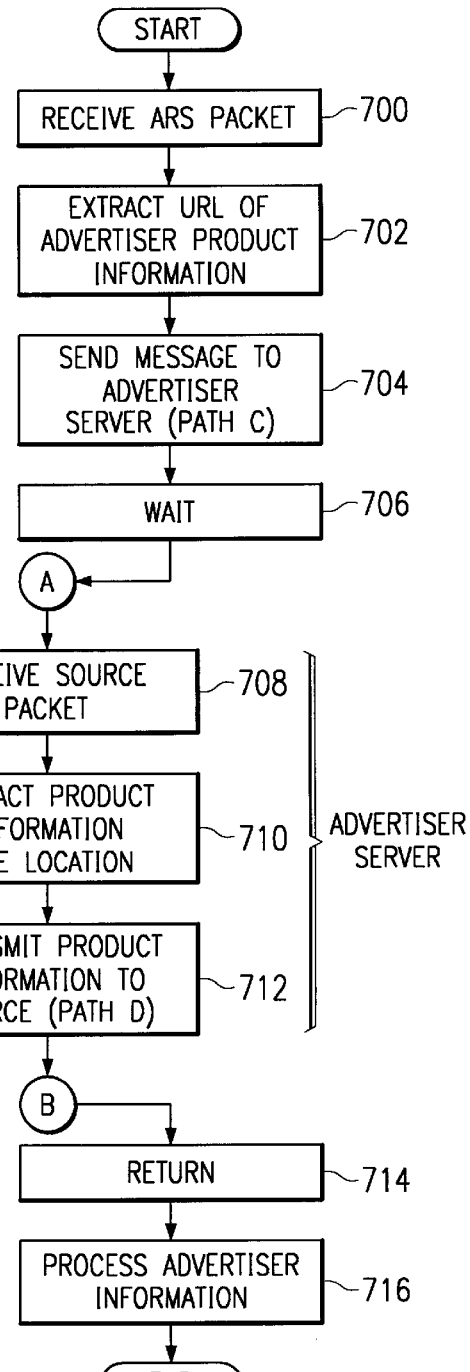
FIG. 7 illustrates a flowchart of the interactive process between the source computer and ARS.

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
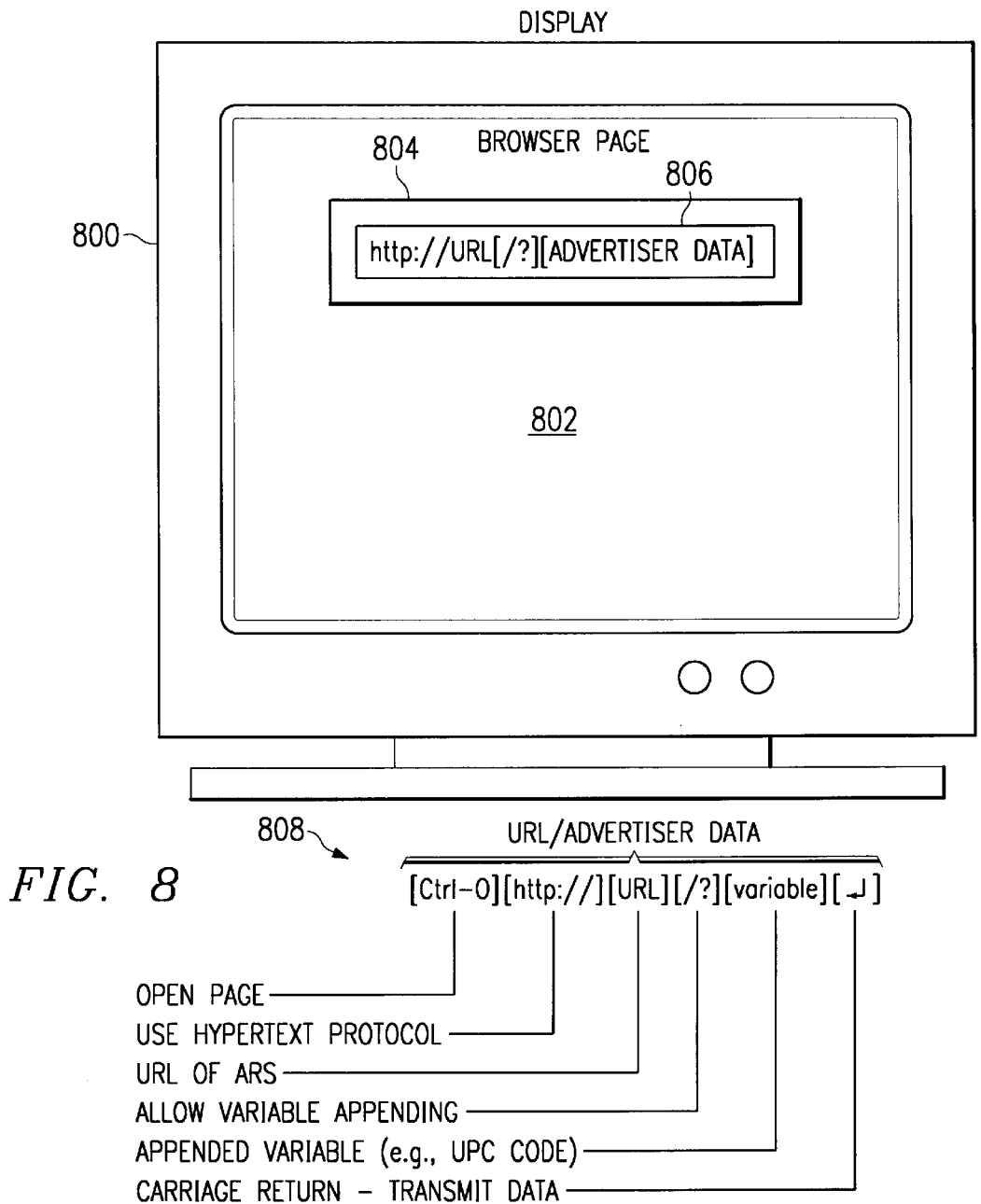
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS308, to the source PC 302, to the advertiser server 312, and back to the source PC 302, occur quickly and are transparent to the viewer. At this point, the next information the viewer sees is the product information which was received from the advertiser server 312.

Figure 9:
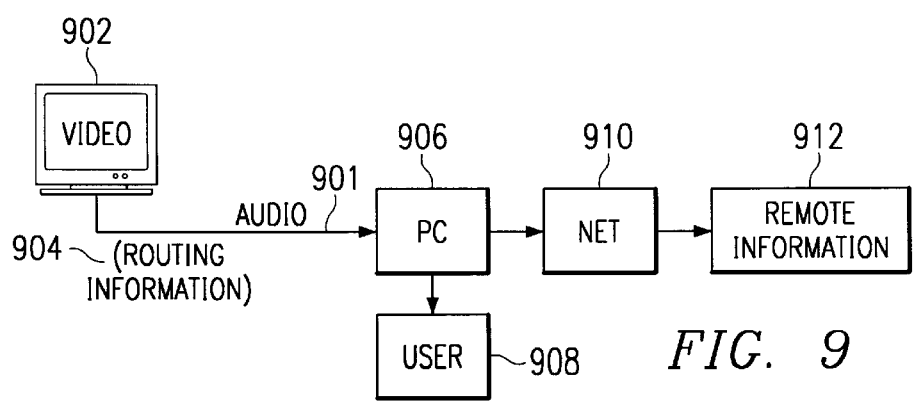
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in real time to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCs 906 that are attachable to the system. This is to be distinguished from information stored in the database 310, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer it is associated there. The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
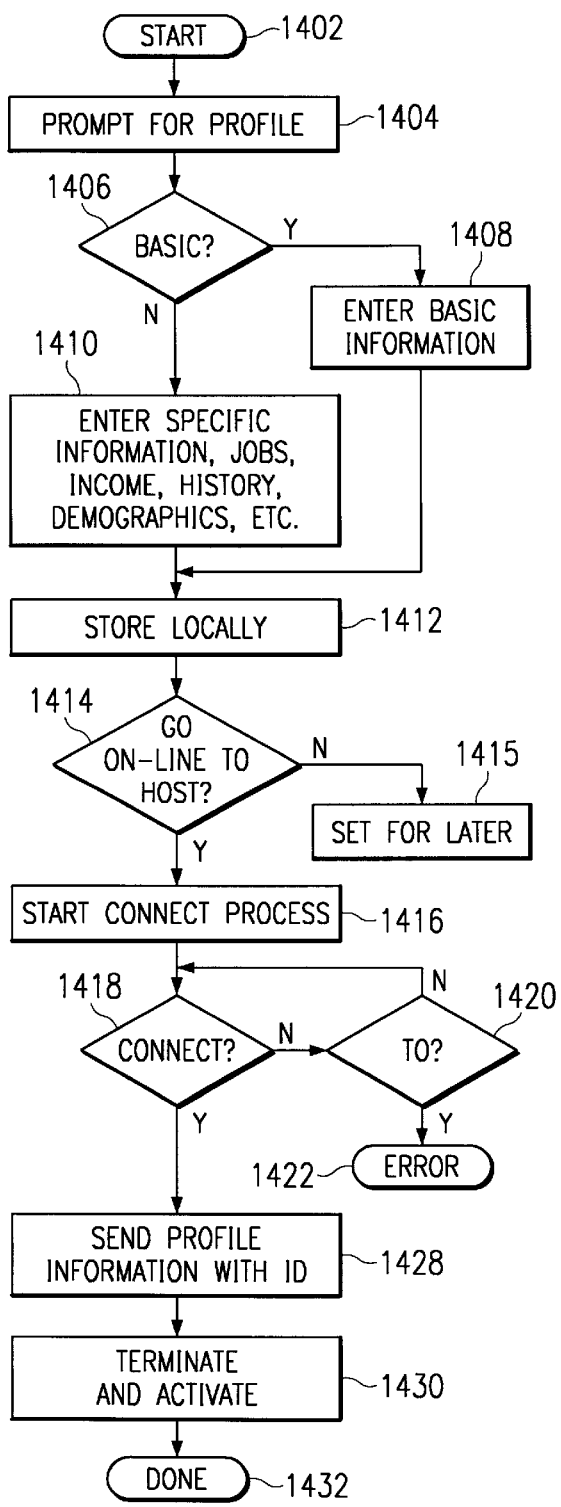
FIG. 14 illustrates a flowchart for generating the profile and storing the profile at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc; if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to decision block 1420 which will time to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
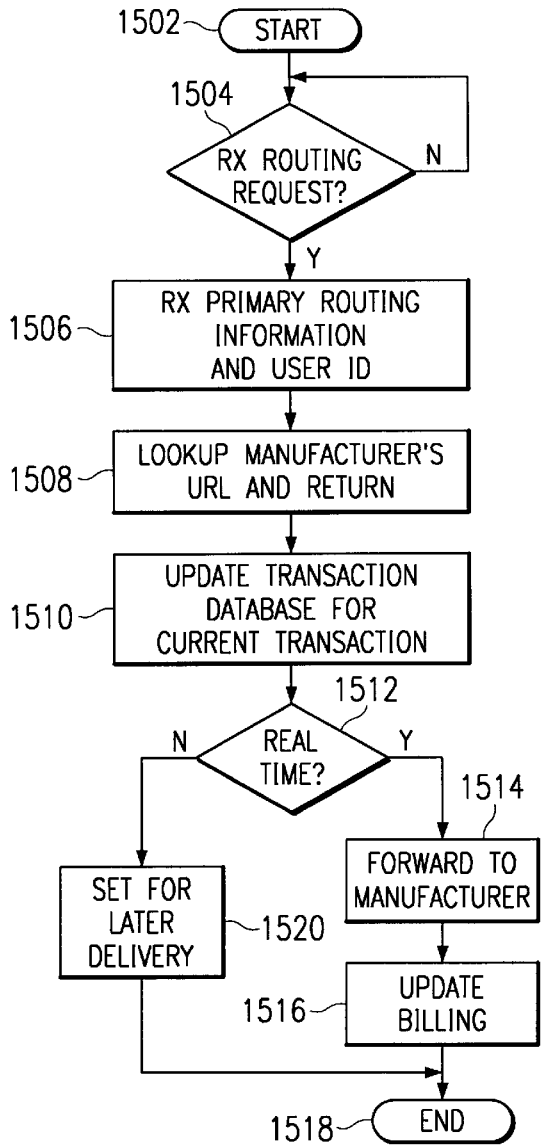
FIG. 15 illustrates a flowchart for processing the profile information when information is routed to a user.

Referring now to FIG. 15, there is illustrated a flowchart depicting the operation of the host when receiving a transaction. The program is initiated at a start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC that PC 112 in order to allow that PC 112 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database. In any event, the transaction database 1310 will accrue all information associated with a particular routing code.

With a realtime transaction, it is possible for a manufacturer to place an ad in a magazine or to place a product on a shelf at a particular time. The manufacturer can thereafter monitor the times when either the advertisements or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, information as to the number of individuals that are watching their particular advertisement and also information as to the background of those individuals, demographic information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with demographic information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Figure 16:
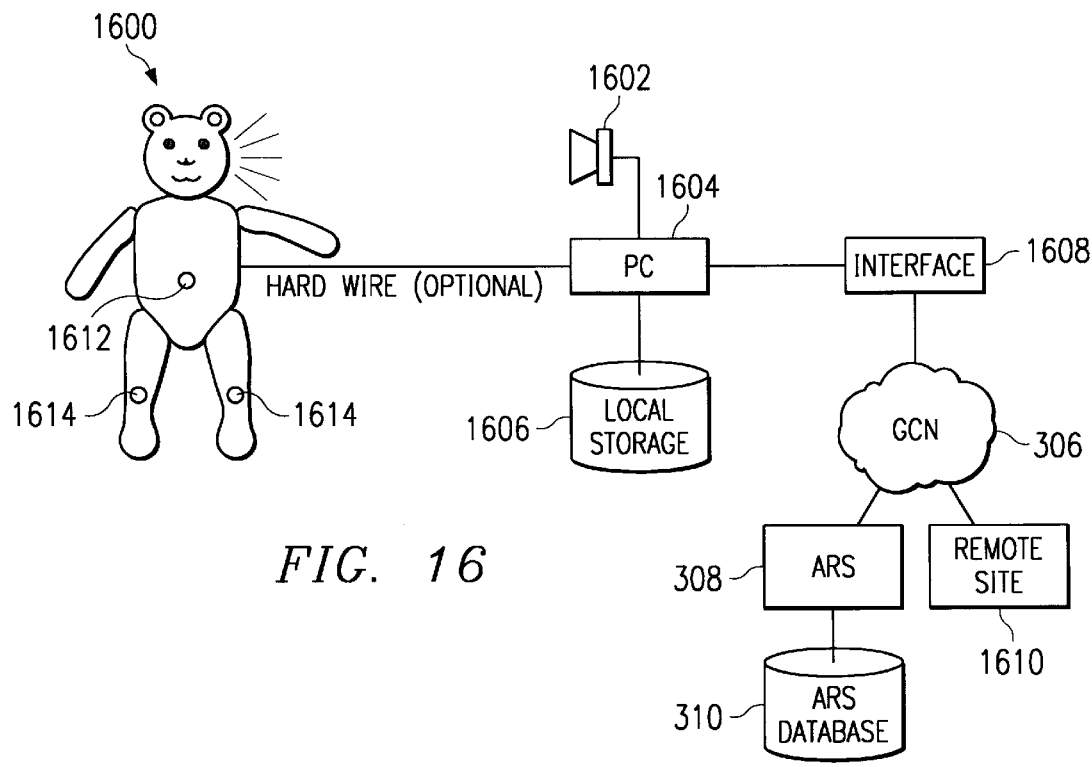

Referring now to FIGS. 16 and 16*a*, there is illustrated a block diagram of an interactive doll according to a disclosed embodiment. A doll 1600 contains one or more sensors 1601 embedded therein, for example on the hand of the doll 1600, and which respond to touch or other kinds of physical stimuli, such that, when a user stresses a particular zone on the doll 1600 having a sensor 1601 in close proximity to the stress point, the doll 1600 activates the respective sensor 1601. The sensor 1601 outputs a signal to a tone generation circuit 1603 in the doll 1600 which in turn outputs an audible tone from an output transducer 1605 (the tone may also be inaudible). The tone generation circuit 1603 is operable to encode predetermined information into the audible tone related to what sensor 1601 is being activated, i.e., each sensor has associated therewith unique identifying information. For each tone, this identifying information is stored in a memory device 1607. When assembled, this audible tone comprises encoded information as to the sensor selected and also ID information associated with the doll 1600. As described hereinabove, this can be any type of tone utilizing a combination of DTMF tones or even a digital encoded signal in the audio range. It is only necessary that the tone be capable of being transmitted in the audio range and have information encoded therein which can be decoded by a receiving device. However, the transmission medium could be an infrared link to transfer the information to the receiving device.

After assembly and transmission of the tone, it is then received by a speaker 1602 (or other receiving device) connected to a personal (PC) computer 1604 (similar to PC 302). The PC 1604 is operable to decode the tone received through speaker 1602 and responds accordingly. The PC 1604 hosts a program which runs in the background and monitors the speaker 1602 for input signal activity. In response to the user activating one of the sensors and the doll 1600 outputting an audible tone signal, the program decodes the audible tone and accesses a local storage unit 1606 to obtain the URL corresponding to the particular tone emitted by the doll 1600. The PC 1604 then assembles a message packet which comprises URL routing information of a server to which the computer is to send the message packet. The assembled message packet also comprises information specific to the particular model of doll 1600, and to the user (or location) of the doll 1600. This may include a user's profile, which information may be contained in the software running on the computer 1604. Note that the user; when initially setting up the software on the PC 1604, inputs information as to the user's profile. At this time, information as to the type of doll and even the doll's unique ID can be input. Alternately, this information (only as to the doll 1600) can be stored in the doll 1600 in the ID storage location 1609.

The program interacts with a communication program residing on the PC 1604 (e.g. a browser) by either launching the browser for transmission of the message packet to the appropriate site or inserting the message packet into an already-running browser for transmission to the site. The message packet is transmitted through an interface 1608 (similar to interface 304) for transmission across the global communication network 306. The global communication network 306 has disposed on it one or more nodes at which reside the one or more ARS systems 308 and also one or more remote sites 1610 associated with the doll 1600. The ARS 308 has associated with it the ARS database 310 which comprises URL routing information cross-referenced to particular advertisers associated with the interactive doll 1600. The one ore more remote sites 1610 contain the advertiser information to be routed back to PC 1604 that are related to the doll 1600, the relationship carried in the ARS database. The PC 1604 then displays the information to the user in response to user's pressing or activating one or more of the sensors (e.g., an abdomen sensor 1612 or an appendage sensor 1614) in the interactive doll 1600. Note that an optional hard-wire connection 1618 may also be used as a communication link from the doll 1600 to the PC 1604. In this case, no audio signals are required for coupling the sensor output to the PC 1604.

As described hereinabove, the ARS 308 receives the information from the PC 1604 and then transfers this information back to the PC browser software in the form of rerouting information. The PC browser information then reroutes the location to the remote site 1610 with additional information such as the sensor 1601 that was depressed, the ID or type of doll 1600 and possible even the some information as to the user. This information was appended to the rerouting information forwarded to the PC by the ARS 308. This rerouting process is conventional with HTTP protocols.

Figure 17:
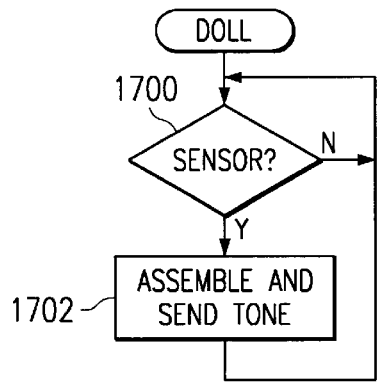
FIG. 17 illustrates a flowchart of the operation of the interactive doll.

Referring now to FIG. 17, there is illustrated a flowchart of the operation of interactive doll 1600. The tone generation system 1603 embedded in the doll 1600 continually monitors the one or more embedded sensors for activation. As indicated by decision block 1700, the tone generation system 1603 of the doll 1600 continually monitors the sensor outputs. If no sensor output is received, flow moves out the "N" path and loops back to the input of the decision block 1700. On the other hand, if any of the one or more sensors 1601 have been activated on the interactive doll 1600, flow moves out the "Y" path of decision block 1700 to a function block 1702 where a tonal message packet is assembled and transmitted. It can be appreciated that since the interactive doll 1600 contains one or more sensors, that activation of any particular sensor results in the transmission of a particular tone unique to that sensor 1601 (noting that the actual tone transmitted may have a common portion associated therewith for doll ID information).

For example, if the user touches the abdomen sensor 1612 of the interactive doll 1600, a tone specific to that abdomen sensor 1612 may be generated and received by PC 1604 for transmission to the ARS server 308. The particular tonal message packet transmitted as a result of activating the abdominal sensor 1612 triggers transmission of information from the remote site 1610 relating to, for example, clothes worn on that part of the body, or to an advertiser emblem configured as part of the doll 1600. The responses to be returned as a result of the abdomen sensor being activated are limitless and can be changed by the advertiser on a regular basis to maintain interest in use of the doll 1600. Similarly, if the user activates an appendage sensor 1614 in, for example, a foot of the interactive doll 1600, a unique tone specific to that appendage sensor 1614 can be generated using the tonal generation circuit within the doll 1600, and from which a different response may be elicited from the advertiser server at the site 1610 for shoes or anything related to that appendage. Similarly, the tonal message packet transmitted to the PC 1604 and then to the ARS 308 will be matched to a different file in the ARS 308 for defining a different appended message to the remote site 1610. When received by the remote site 1610, the remote site 1610 will transmit back to the PC 1604 and cause the browser to display information linked to that particular sensor and tonal message packet. After assembling and sending the tonal message packet as indicated in function block 1702, the program simply loops back to the input of decision block 1700 to wait for other sensor activations. Note that, for each new sensor depression, there will be a new tonal message picked up by the background program which will cause the browser to again send information to the ARS 308. As such, the doll 1600 can not interact directly with the remote site 1610. This is advantageous as the remote site is now not required to store any information as to a given doll's configuration or even as to a given tone decoding scheme. Further, the remote site 1610 need not have any association with the doll 1600 initially. This relationship could be made at a later time. The doll 1600 therefore acts as a platform for later relationships. For example, suppose a doll manufacturer made and sold dolls with the tonal generation system of the present disclosure. This manufacturer could then contract with a doll clothing manufacturer to provide clothing to the owner of the doll. When the dolls foot sensor is depressed, then the ARS 308 would determine what relationship this sensor has for that doll. This relationship would define a clothing supplier for that doll and even for that appendage. The response could even be personalized such as "Welcome Amy, we have everything you need for your doll Wiggles and here is the specific item you requested."

Figure 18:
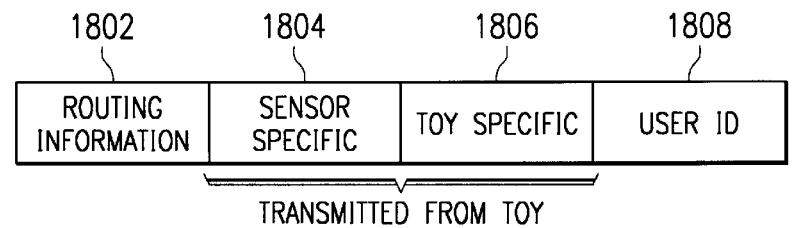
FIG. 18 illustrates a message packet assembled by the computer in response to receiving a tonal signal from the interactive doll.

Referring now to FIG. 18, there is illustrated a message packet assembled by the PC in response to receiving a tonal signal from the interactive doll. A message packet 1800 comprises a number of bits of information necessary for linking the interactive doll 1600 to specific responses from remote sites 1612. For example, the message package 1800 includes routing information 1802 which includes the URL address location of the user using the interactive doll 1600. The routing information 1802 will also include addressing information for transmission of the information packet 1800 to the ARS 308. Also included in the message packet 1800is sensor-specific information 1804 which identifies the particular sensor activated of the interactive doll 1600. For example, the particular sensor activated needs to be identified in some manner and that particular information transmitted along with the message packet 1800 to elicit the appropriate response from the remote site 1610. Additionally, the toy-specific information 1806 of doll 1600 must be identified as the manufacturer may have any variety of dolls 1600 which embody the disclosed architecture. For example, instead of having an interactive doll 1600, if the manufacturer had an interactive vehicle (toy truck or the such) wherein the user presses on a door thereof, this may elicit a different response from the remote site 1610. Therefore, it is necessary to transmit in the message packet 1800 some information which distinguishes between the specific types of toys operable with the disclosed architecture. This relationship, of course, is disposed at the ARS 308 and only needs some type of ID from the doll 1600 or other article. The message packet 1800 can also contain information which uniquely identifies the user. Therefore, a user ID packet 1808 is included in the message packet 1800 to provide this capability.

Figure 19:
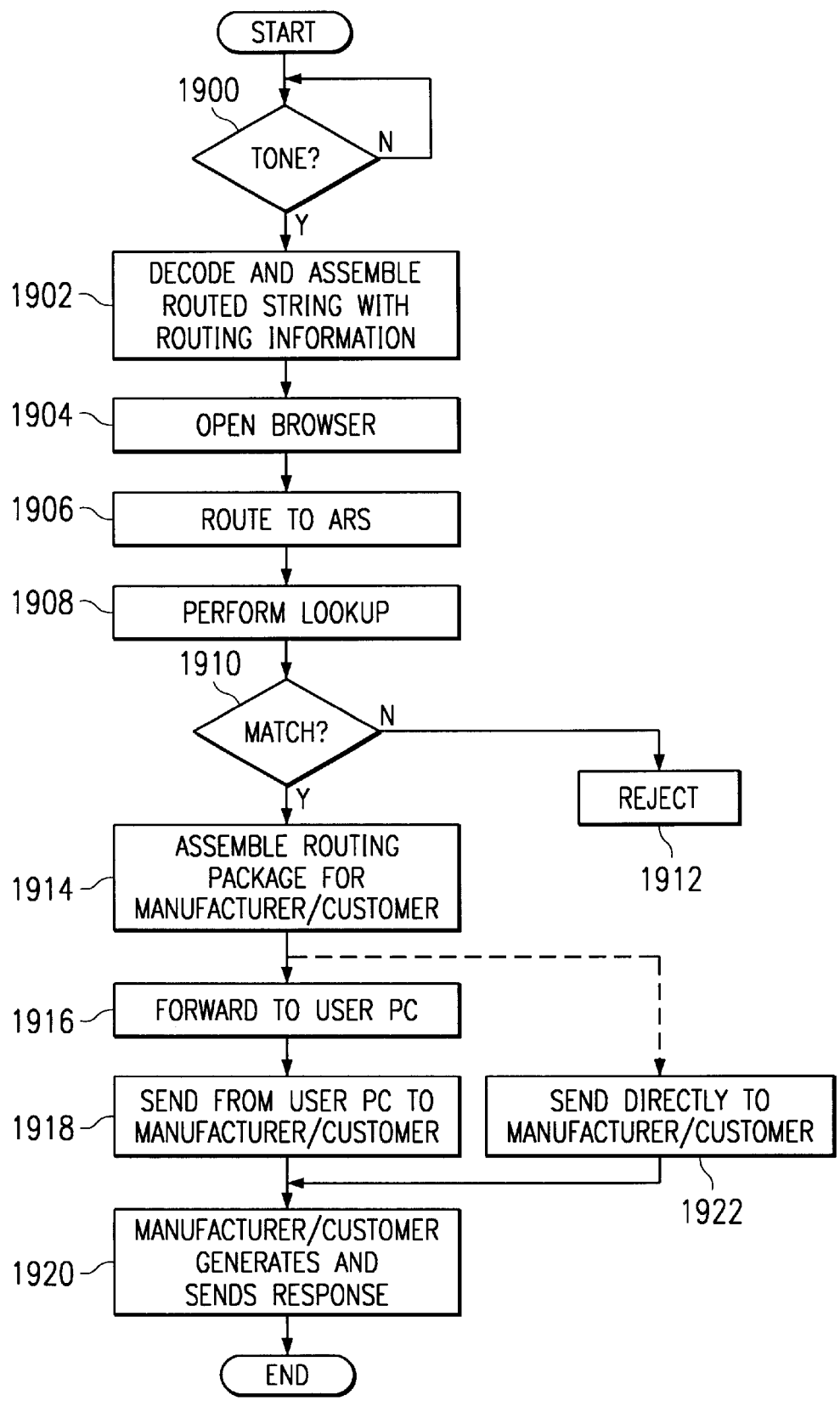
FIG. 19 illustrates a flowchart of the overall operation of the disclosed architecture from the perspective of the computer.

Referring now to FIG. 19, there is illustrated a flowchart of the overall operation of the disclosed architecture from the perspective of the computer. Flow begins from a starting point and moves to a decision block 1900 wherein the PC 1604 continually monitors the speaker 1602 for receipt of a tone signal from the interactive doll 1600. If no tone signal is received, flow moves out the "N" path of decision block 1900 back to the input to continually monitor the speaker 1602. If a tone has been received, flow moves out the "Y" path to a function block 1902 where the tonal signal received from the interactive doll 1600 is decoded and a message packet 1800 is assembled with the routing string which contains routing information. Flow then moves to a function block 1904 where a computer browser is launched and a browser window opened. The proprietary program running on PC 1604 then inserts the message packet 1800 into the browser for transmission to the ARS 308, as indicated in function block 1906.

Flow then moves to a function block 1908 where a lookup function is performed at the ARS 308. The lookup function is performed using the sensor-specific and toy-specific information (1804 and 1806, respectively) of the message packet 1800. Flow then moves to a decision block 1910 where, if a match has not occurred, flow moves out the "N" path to a function block 1912 where the user is rejected. This rejection may result in a message being transmitted back to PC 1604 to alert the user that information has been received which has been rejected and that the user should take other action to resolve the rejection. If there is a match in the lookup function, flow moves out the "Y" path of decision block 1910 to a function block 1914 where an intermediate packet is assembled by the ARS 308 for routing back to the PC 1604 and ultimately to the remote site 1610. As mentioned hereinabove, the remote site 1610 is the manufacturer site that comprises the information linked to the particular interactive doll 1600. The intermediate packet assembled by the ARS 308 is then transmitted back to the PC 1604, as indicated in function block 1916. This intermediate packet is then processed by PC 1604 such that it is redirected to the remote site 1610, as indicated in function block 1918. In response, the remote site 1610 decodes the intermediate message packet and sends back information to the PC 1604 to be presented visually or audibly to the user. Alternatively, the intermediate message packet assembled by the ARS 308 may be transmitted directly to the remote site 1610, as indicated in flow from function block 1914 to a function block 1922. From function block 1922, flow is then to the input of function block 1920 where the remote site 1610 then transmits back to the PC 1604 information to be displayed to the user. Flow then moves to an end state where the program ends.

Referring now to FIG. 20, there is illustrated a flowchart of an alternative embodiment where the remote site 1610 responds differently to receiving a message from the interactive doll 1600. Flow starts at a starting point and moves to a decision block 2000 where the PC 1604 continually monitors the input of the speaker 1602. If a tonal signal is not received, flow moves out the "N" path of decision block 2000 and loops back to the input to continually monitor the speaker 1602. If atonal signal has been received from the interactive doll 1600, flow moves out the "Y" path of decision block 2000 to a function block 2002 where the tonal signal is decoded by the proprietary software residing on the PC 1604, and a message packet 1800 is assembled with routing information. Flow then moves to function block 2004 where a browser (or communication package) running on PC 1604 is launched and the message packet 1800 inserted for transmission. Flow moves to a function block 2006 where the message packet 1800 is routed to the ARS 308.

After the message packet 1800 is routed to the ARS 308, flow then moves to a function block 2008 where the ARS 308 receives the message packet 1800 and performs a lookup function with the resident database using information contained within the message packet 1800. As indicated in a decision block 2010, if a match does not occur during the lookup process, flow moves out the "N" path to a function block 2012 where the process is rejected. As mentioned hereinabove, this rejection process may alert the user via a message using PC 1604 which indicates that the message was rejected and the reasons for the rejection. If there was a match, flow moves out the "Y" path of decision block 2010 to a function block 2014 where the ARS 308 provides or generates an intermediate message packet for transmission back to the PC 1604 and ultimately to establish a connection to remote site 1610. Flow then moves to a function block 2016 where the remote site 1610 takes the appropriate action in response to the tonal signal received from the interactive doll 1600. In this particular example, the appropriate action taken comprises three different actions: (1) a function block 2018 indicates that data will be downloaded from the remote site 1610 to the PC 1604; (2) a function block 2020 indicates that program configuration information may be downloaded as an appropriate action from remote site 1610 to the PC 1604; and (3) function block 2022 indicates that commands may be downloaded from the remote site 1610 back to the PC 1604 which generate responses or actions from the PC 1604 to the user. For example, if the user presses or activates a first sensor on interactive doll 1600, it may trigger a response from remote site 1610 to download an updated configuration file to PC 1604. Similarly, a second sensor activated on the interactive doll 1600 may simply trigger a command from the remote site 1610 back to the PC 1604 which in turn generates an audio and/or visual response to the user in the form of, for example, music, verbal messages, graphic messages, etc. Similarly, as indicated in function block 2018, activation of a third sensor in the interactive doll 1600 may simply generate a response from the remote site 1610 of downloading data directly to the PC 1604 for playback to the user.

It can be appreciated that the sensors employed with the doll need not be located within the doll, but may also be attached to the outside surface of the doll. Furthermore, some sensors may be implanted in the doll with exposure to the outside, such as eyes, where optical sensors may be used to sense changes in light or to receive optical signals. The doll is also operable to accommodate external add-ons having sensors associated therewith which couple to the doll, and which when activated trigger the generation of audible tones by the internal tone generation circuit of the doll which are unique to that particular add-on item. In essence, the sensors may be of any type which react to some type of physical stimuli and output a signal in response thereto.

Note also that the toy-specific code may be stored in the toy, such that the encoded audible tone contains the toy-specific code. The processor in the PC is then operable to decode the audible tone to obtain the toy-specific code. Alternatively, the proprietary program residing with the processor may, upon implementation of a new interactive toy, require the user to enter, for example, the particular model and serial number of the toy, or provide a menuing system where the user simply selects the type of toy being used from an initial entry of all the necessary information. This reduces the complexity involved with encoding this information into the audible tone. The program simply "knows" that the toy being used is a specific model of doll 1600 instead of, for example, a truck.

An example of an interactive scenario may be as follows: The user depresses the sensor on the doll and is connected with an interactive game at the remote site 1610. The user is then presented with some type of game which expects some type of response from the user in the form of sensor depression. For example, it may be a child as a user and the child may be prompted to "tickle" the doll 1600. This will be relayed to the remote site and then a new screen returned to the user. It may be the same screen with a sound such as a laugh. Since the remote site knows where the signal is coming from, it can process the signals from the PC as relayed from the ARS 308 in a single and continuous game.

It may be that the remote site remembers the sequence of sensor depressions in a given game session and then makes a determination based on this sequence as to the next action it will take in the form of what type of information it will return.

Although the preferred embodiment has been described in detail, it should be understood that various changes, substitutions and alterations can be made therein without departing from the spirit and scope of the invention as defined by the appended claims.

What is claimed is:

1. An interactive doll, comprising:

a doll having one or more sensors, said one or more sensors operable to trigger output of an output signal from said doll in response to being activated by physical stimuli of a user, said doll located at output signal coupled to a first node of a global communication network;

a processor for processing said signal, said processor located at said first node and operable to link said output signal with one or more remote nodes located on said global communication network; and wherein said sensors each have associated therewith destination routing information to a destination one of said one or more remote nodes, which said destination routing information is disposed at an advertiser reference server on an intermediate one of said one or more remote nodes, such that activation of said one or more sensors triggers assembly of a message packet by said processor, said message packet containing intermediate routing information for accessing said advertiser reference server at said intermediate one of said one or more remote nodes and sensor information corresponding to said triggered output signal for routing to the one or more of said sensor activated, and said sensor information having an associative relationship at said advertiser reference server with said associated destination routing information;

said processor operable to transfer said message packet to said intermediate one of said one or more remote nodes in accordance with said intermediate routing information associated with said message packet;

wherein said advertiser reference server performs a table lookup to cross reference said received sensor information of said message packet with said associated destination routing information, which said associated destination routing information is associated with a manufacturer of said doll, wherein said cross referenced destination routing information defines manufacturer routing information of a web server of said manufacturer located at said destination one of said one or more remote nodes; and wherein said advertiser server returns said manufacturer routing information to said processor and said processor is operable to access said one or more remote nodes destination node associated with said manufacture and said destination node operable to return information to said processor for presentation to said user, in response to said one or more sensors being activated.

2. The doll of claim 1, wherein said one or more sensors are pressure sensors which are located within said doll, and said signal is an audible tone which is processed by said processor.

3. The doll of claim 1, wherein said doll connects to said processor using a cable which carries said signal to said processor.

4. The doll of claim 1, wherein said signal is an audible tone having encoded therein information which uniquely identifies said audible tone with select ones of said one or more sensors.

5. The doll of claim 1, wherein said message packet further comprises sensor-specific information, toy-specific information, and a unique identification number of said user.

6. The doll of claim 1, wherein a web server of a manufacturer of said doll returns advertising related to activation of a select one of said one or more sensors.

7. The doll of claim 1, wherein said processor links said signal with said first one of said one or more remote nodes by inserting routing information into a communication program, said communication program operable to communicate with said one or more remote nodes.

8. A method of operating an interactive doll, comprising the steps of;

providing a doll having one or more sensors operable to trigger output of an output signal from the doll in response to being the one or more sensors being activated by a physical stimuli of a user, the doll located at output signal coupled to a first node of a global communication network;

processing with a processor the said output signal output by the doll, the processor located at the first node and operable to link the signal with one or more remote nodes located on the global communication network;

wherein the sensors each have associated therewith destination routing information to a destination one of the one or more remote nodes, which said destination routing information is disposed at an advertiser reference server on an intermediate one of the one or more remote nodes, such that activation of the one or more sensors triggers assembly of a message packet by the processor, the message packet containing intermediate routing information for accessing the advertiser reference server at the intermediate one of the one or more remote nodes and sensor information corresponding to the triggered output signal for routing to the one or more of the sensor activated, and the sensor information having an associative relationship at the advertiser reference server with the associated destination routing information;

the processor operable to transfer the message packet to the intermediate one of the one or more remote nodes in accordance with the intermediate routing information associated with the message packet;

wherein the advertiser reference server performs a table lookup to cross reference said received sensor information of the message packet with the associated destination routing information, which the associated destination routing information is associated with a manufacturer of the doll, wherein the cross referenced destination routing information defines manufacturer routing information of a web server of the manufacturer located at the destination one of the one or more remote nodes; and wherein the advertiser server returns the manufacturer routing information to the processor and the processor is operable to access the one or more remote nodes destination node associated with the manufacture and the destination node operable to return information to the processor for presentation to the user, in response to the one or more sensors being activated.

9. The method of claim 8, wherein said one or more sensors are pressure sensors which are located within the doll, and the signal is an audible signal which is processed by said processor.

10. The method of claim 8, wherein the doll connects to the processor using a cable which carriers the signal to the processor.

11. The method of claim 8, wherein the signal is an audible tone having encoded therein information which uniquely identifies the audible tone with select ones of the one or more sensors.

12. The method of claim 8, wherein the message packet further comprises sensor-specific information, toy-specific information, and a unique identification number of the user.

13. The method of claim 8, wherein a web server of a manufacturer of the doll returns advertising related to activation of a select one of the one or more sensors.

14. The method of claim 8, wherein the processor links the signal with the first one of the one or more remote nodes by inserting routing information into a communication program, the communication program operable to communicate with the one or more remote nodes.

* * * * *